US010218756B2

(12) United States Patent
Chen

(10) Patent No.: US 10,218,756 B2
(45) Date of Patent: Feb. 26, 2019

(54) STREAMLINED DELIVERY OF VIDEO CONTENT

(75) Inventor: Joseph Yongxiang Chen, Englewood, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 13/344,674

(22) Filed: Jan. 6, 2012

(65) Prior Publication Data
US 2013/0179541 A1 Jul. 11, 2013

(51) Int. Cl.
H04L 29/06 (2006.01)
H04N 21/222 (2011.01)
(Continued)

(52) U.S. Cl.
CPC ........ H04L 65/4084 (2013.01); H04L 65/608 (2013.01); H04L 65/80 (2013.01);
(Continued)

(58) Field of Classification Search
CPC ............... H04L 29/08072; H04L 29/06; H04L 29/0809; H04L 29/08117; H04L 65/4084; H04L 65/80; H04L 65/608; H04L 67/02; H04L 67/2842; H04L 21/23106; H04L 21/8456; H04L 21/6587; H04L 21/222; H04L 65/4092; H04L 29/06523; H04L 29/608; H04L 29/06517; H04L 29/06476;
(Continued)

(56) References Cited

U.S. PATENT DOCUMENTS 5,913,024 A * 6/1999 Green ..................... G06F 9/468
 726/3
6,714,985 B1 * 3/2004 Malagrino .............. H04L 29/06
 370/394
(Continued)

FOREIGN PATENT DOCUMENTS

WO PCT/US2010/060317 * 11/2011

OTHER PUBLICATIONS

Sen, S.; Rexford, J.; Towsley, D., "Proxy prefix caching for multimedia streams," Mar. 21-25, 1999, Eighteenth Annual Joint Conference of the IEEE Computer and Communications Societies. Proceedings. IEEE , vol. 3, pp. 1310-1319.*
(Continued)

Primary Examiner — Nelson Giddins
(74) Attorney, Agent, or Firm — Banner & Witcoff, Ltd.

(57) ABSTRACT

A content delivery server may provide content to a requesting client device using a streamlined HTTP enhancement proxy delivery technique. For example, an HTTP proxy server may receive a request for video content or a fragment of video content from a client device. The request may be associated with a timeout scheduled to occur if no content has been received after a specified amount of time. The server may then transmit a request for the content to a remote server, such as an upstream cache server in the proxy server's CDN. When the proxy server receives a portion of the requested content from the remote server, the proxy server begins transmitting the portion to the client device before the requested content has been completely received and buffered. The client device may then begin receiving data from the proxy server before timeout has occurred.

22 Claims, 6 Drawing Sheets

US 10,218,756 B2
Page 2

(51) Int. Cl.
*H04N 21/231* (2011.01)
*H04N 21/845* (2011.01)
*H04N 21/6587* (2011.01)
*H04L 29/08* (2006.01)

(52) U.S. Cl.
CPC .......... *H04L 67/02* (2013.01); *H04L 67/2842* (2013.01); *H04N 21/222* (2013.01); *H04N 21/23106* (2013.01); *H04N 21/6587* (2013.01); *H04N 21/8456* (2013.01)

(58) Field of Classification Search
CPC . H04L 29/08702; H04L 47/36; H04L 47/365; H04L 69/166; G06Q 30/02; H04N 21/23106; H04N 21/8456; H04N 21/845; H04N 21/222; G06F 17/30861; H04W 28/065
USPC ........................................................ 709/219
See application file for complete search history.

(56) References Cited

U.S. PATENT DOCUMENTS

| | | | | |
|---|---|---|---|---|
| 6,785,704 B1* | 8/2004 | McCanne | ........... | H04L 12/1877 709/201 |
| 6,894,976 B1* | 5/2005 | Banga | ............. | H04L 69/16 370/235 |
| 7,024,485 B2* | 4/2006 | Dunning | ............. | G06F 17/30017 709/232 |
| 7,505,484 B2* | 3/2009 | Pancholi | ............. | H04L 69/166 370/470 |
| 7,734,730 B2* | 6/2010 | McCanne | ............. | H04L 69/329 709/219 |
| 7,840,680 B2* | 11/2010 | Zuckerman | ......... | H04L 67/1002 709/217 |
| 7,844,712 B2* | 11/2010 | Zuckerman | ......... | H04L 67/1002 709/217 |
| 7,849,163 B1* | 12/2010 | Issa | ................ | H04L 67/06 709/205 |
| 7,995,590 B2* | 8/2011 | Cutaia | ............... | H04L 65/103 370/260 |
| 8,019,899 B2* | 9/2011 | Zhang | ............... | H04L 69/28 370/230 |
| 8,139,924 B2* | 3/2012 | Walters | .............. | H04N 21/6581 386/293 |
| 8,140,672 B2* | 3/2012 | Crowder | ............. | G06F 15/173 709/224 |
| 8,244,887 B2* | 8/2012 | Abu-Samaha | .......... | H04L 67/02 709/203 |
| 8,307,031 B1* | 11/2012 | Grieve | ................ | H04L 69/28 709/203 |
| 8,341,688 B2* | 12/2012 | Ngo | ................... | H04N 7/17336 725/101 |
| 8,392,748 B2* | 3/2013 | Bocharov | ........ | H04N 21/23116 709/217 |
| 2001/0036185 A1* | 11/2001 | Dempo | ............... | H04L 29/06 370/392 |
| 2002/0062369 A1* | 5/2002 | von Klopp | ........ | G06F 17/30876 709/224 |
| 2003/0005144 A1* | 1/2003 | Engel | ................ | H04L 47/10 709/235 |
| 2004/0006636 A1* | 1/2004 | Oesterreicher | ... | H04L 29/06027 709/231 |
| 2004/0044761 A1* | 3/2004 | Phillipi | ................ | H04L 29/06 709/223 |
| 2004/0068579 A1* | 4/2004 | Marmigere | ............ | H04L 29/06 709/242 |
| 2005/0025185 A1* | 2/2005 | Brown | ................... | H04L 29/06 370/474 |
| 2005/0030972 A1* | 2/2005 | Madukkarumukumana | ................ | H04L 49/90 370/463 |
| 2005/0091395 A1* | 4/2005 | Harris | .................... | H04L 29/06 709/232 |
| 2005/0187968 A1* | 8/2005 | Dunning | .......... | G06F 17/30017 |
| 2006/0045131 A1* | 3/2006 | Pancholi | ............... | H04L 69/166 370/472 |
| 2006/0159102 A1* | 7/2006 | Major | ................. | H04L 12/5601 370/395.6 |
| 2006/0221844 A1* | 10/2006 | Subramanian | .......... | H04L 12/18 370/248 |
| 2007/0005787 A1* | 1/2007 | Igarashi | ................... | H04L 47/10 709/230 |
| 2007/0053363 A1* | 3/2007 | Chen | ................ | H04L 29/06027 370/395.21 |
| 2007/0079342 A1* | 4/2007 | Ellis | ....................... | H04N 5/913 725/89 |
| 2007/0286233 A1* | 12/2007 | Latif | ....................... | H04L 12/06 370/466 |
| 2008/0040498 A1* | 2/2008 | Setlur | .................. | H04N 21/631 709/231 |
| 2008/0098101 A1* | 4/2008 | Black | .................. | H04L 67/1008 709/223 |
| 2008/0162922 A1* | 7/2008 | Swartz | .................. | H04L 63/162 713/150 |
| 2008/0240123 A1* | 10/2008 | Cutaia | .................... | H04L 65/103 370/401 |
| 2009/0067325 A1* | 3/2009 | Baratakke | ................ | H04L 69/16 370/229 |
| 2009/0067429 A1* | 3/2009 | Nagai | ..................... | H04L 47/36 370/392 |
| 2009/0110003 A1* | 4/2009 | Julien | .................. | H04L 49/90 370/476 |
| 2009/0116490 A1* | 5/2009 | Charpentier | .......... | H04L 1/1841 370/395.1 |
| 2009/0225757 A1* | 9/2009 | Imao | .................... | H04L 69/16 370/392 |
| 2009/0316698 A1* | 12/2009 | Menten | ................... | H04L 47/10 370/392 |
| 2010/0002697 A1* | 1/2010 | Krishnan | ............. | H04L 12/1836 370/390 |
| 2010/0067540 A1* | 3/2010 | Park | ....................... | H04L 49/3072 370/419 |
| 2010/0094959 A1* | 4/2010 | Zuckerman | ......... | H04L 67/1097 709/219 |
| 2010/0094963 A1* | 4/2010 | Zuckerman | ......... | H04L 67/1097 709/219 |
| 2010/0121940 A1* | 5/2010 | Reeser | ............. | G06F 17/30902 709/219 |
| 2010/0131671 A1* | 5/2010 | Kohli | ...................... | H04L 65/60 709/233 |
| 2010/0183009 A1* | 7/2010 | Baratakke | ............ | G06F 9/5077 370/392 |
| 2010/0281042 A1* | 11/2010 | Windes | ............. | H04N 7/17327 707/756 |
| 2011/0022471 A1* | 1/2011 | Brueck | .................. | G06Q 30/02 705/14.61 |
| 2011/0032428 A1* | 2/2011 | Bing | ............. | H04N 21/234381 348/608 |
| 2011/0087733 A1* | 4/2011 | Shribman | ............. | H04L 41/046 709/204 |
| 2011/0096828 A1* | 4/2011 | Chen | ............. | H04N 21/23106 375/240.02 |
| 2011/0126248 A1* | 5/2011 | Fisher | ................ | H04N 7/17318 725/95 |
| 2011/0137934 A1* | 6/2011 | Pizzorni | .................. | G06F 8/60 707/769 |
| 2011/0185041 A1* | 7/2011 | Hunt | .................... | H04L 65/1069 709/219 |
| 2011/0238789 A1* | 9/2011 | Luby | ................ | H04N 21/23106 709/219 |
| 2011/0239078 A1* | 9/2011 | Luby | ................ | H04N 21/23106 714/752 |
| 2011/0243138 A1* | 10/2011 | Oh | ......................... | H04L 69/16 370/392 |
| 2011/0264727 A1* | 10/2011 | Keum | .................. | H04L 65/4084 709/203 |

(56) References Cited

U.S. PATENT DOCUMENTS

| | | | | |
|---|---|---|---|---|
| 2011/0270944 A1* | 11/2011 | Keilhau | G06F 9/544 | 709/212 |
| 2011/0271007 A1* | 11/2011 | Wang | H04L 45/306 | 709/238 |
| 2011/0276699 A1* | 11/2011 | Pedersen | H04L 45/24 | 709/227 |
| 2011/0302320 A1* | 12/2011 | Dunstan | G06F 17/30017 | 709/235 |
| 2012/0042050 A1* | 2/2012 | Chen | H04L 65/604 | 709/219 |
| 2012/0054361 A1* | 3/2012 | Luzzatti | H04L 12/66 | 709/231 |
| 2012/0063449 A1* | 3/2012 | Frederic | H04L 69/166 | 370/389 |
| 2012/0072957 A1* | 3/2012 | Cherukuwada | H04N 21/23412 | 725/93 |
| 2012/0106327 A1* | 5/2012 | Lin | H04L 12/66 | 370/230 |
| 2012/0131223 A1* | 5/2012 | Watson | H04L 69/16 | 709/235 |
| 2012/0144000 A1* | 6/2012 | Nogami | H04L 65/4084 | 709/219 |
| 2012/0144443 A1* | 6/2012 | Bae | H04N 21/2187 | 725/110 |
| 2012/0155460 A1* | 6/2012 | Gu | H04W 28/06 | 370/389 |
| 2012/0198020 A1* | 8/2012 | Parker | H04W 12/08 | 709/217 |
| 2012/0281559 A1* | 11/2012 | Ner | H04W 28/06 | 370/252 |
| 2012/0320752 A1* | 12/2012 | Gouache | H04L 45/24 | 370/237 |
| 2013/0007040 A1* | 1/2013 | John | G06F 17/30545 | 707/769 |
| 2013/0077940 A1* | 3/2013 | Shackleton | H04N 5/91 | 386/249 |
| 2013/0089142 A1* | 4/2013 | Begen | H04N 21/23424 | 375/240.12 |
| 2013/0091251 A1* | 4/2013 | Walker | H04N 21/6125 | 709/219 |
| 2013/0091303 A1* | 4/2013 | Mitra | H04L 61/2557 | 709/238 |
| 2013/0097309 A1* | 4/2013 | Ma | H04L 29/08099 | 709/224 |
| 2013/0124679 A1* | 5/2013 | Harrang | H04L 65/4023 | 709/217 |
| 2013/0124749 A1* | 5/2013 | Thang | H04L 65/4092 | 709/231 |
| 2013/0132507 A1* | 5/2013 | Swaminathan | H04N 21/2187 | 709/217 |
| 2013/0138775 A1* | 5/2013 | Shah | H04L 67/06 | 709/219 |
| 2013/0166625 A1* | 6/2013 | Swaminathan | H04N 21/64738 | 709/203 |
| 2013/0279464 A1* | 10/2013 | Gu | H04W 28/06 | 370/329 |
| 2013/0290493 A1* | 10/2013 | Oyman | H04W 4/70 | 709/219 |
| 2014/0337473 A1* | 11/2014 | Frusina | H04L 5/003 | 709/217 |
| 2014/0372627 A1* | 12/2014 | Axelrod | H04L 67/327 | 709/241 |
| 2015/0032899 A1* | 1/2015 | Willars | H04L 65/4076 | 709/231 |

OTHER PUBLICATIONS

J. Postel, "The TCP Maximum Segment Size and Related Topics", Nov. 1983, Network Working Group, RFC: 879, p. 1-11.*

D. Borman, "TCP Options and Maximum Segment Size (MSS)", Jul. 2012, Internet Engineering Task Force (IETF), RFC: 6691, p. 1-9.*

* cited by examiner

STREAMLINED DELIVERY OF VIDEO CONTENT

BACKGROUND

Content delivery networks (CDNs) provide content, such as video content, to users. The CDNs typically employ a hierarchy of computer servers, with an origin server that originally supplies the content, and a hierarchy of proxying servers, caching servers or both organized hierarchically below the origin server to help distribute the content and reduce the load on the origin server.

When a user requests content, such as a particular video, the user's client device (e.g., computer, cell phone, internet-enabled television set) may transmit a request for a fragment of the user-requested content, such as a two-second video fragment, to a proxy server using Hypertext Transfer Protocol (HTTP). The proxy server can provide the fragment if it is available, and if it is not, the proxy server can transmit a request to another proxy server that is higher up in the content's hierarchy, and the process can repeat further up the hierarchy until a server having the requested fragment is reached (or until the source is reached). When the proxy server receives the fragment from the higher level server, the proxy server waits until it possesses the entire content fragment before transmitting data to the client device. This process repeats until all fragments of the user-requested content have been received by the client device.

Content requests are often associated with a timeout, a specified period of time that is allowed to elapse before the request is to be retransmitted or abandoned if none of the requested content has been received. When the user requests high bit rate content, such as a high-definition television content, the request may timeout if the proxy server cannot cache and then deliver the requested content in time. In response to the request timeout, the client device may abandon the request or transmit a redundant request for the content, often at a lower bit rate, which can result in network overload and other bandwidth inefficiencies. In either case, the user's viewing experience is negatively impacted by lower quality content, or no content at all, being delivered to the user's device. In the context of CDNs, where multiple servers are used to deliver content, these inefficiencies are escalated because servers at each level of the CDN hierarchy may be respectively transmitting multiple requests for the same content as a result of timeout.

Accordingly, there remains an ever-present need to improve the delivery of content, and to balance that need with the strains on the network.

SUMMARY

Some features described herein relate generally to allowing a client device to request content from a computing device, such as a proxy server, and receive data from the computing device before timeout of the request has occurred. Some disclosed aspects relate to streamlined caching (also referred to as progressive caching), where data transmission by a proxy server to a client device begins before it has been completely received by the proxy server from another server. As a result, timeout of a content request may be avoided, allowing a client or user device to receive and provide high data rate content, such as HD or 3D video or video fragments, to the requesting user.

In an embodiment, a server may receive an HTTP request for content, such as a data unit, from a client device, such as a gateway device coupled to a user's video display (e.g., computer monitor, television set, smart phone, etc.). The data unit may be, for example, content such as a video or a fragment of a video requested by a user, (e.g., a two-second video fragment). The server may determine that it does not possess the requested content and transmit a request for the content to a remote server, such as an upstream cache server in the server's CDN. The server may begin receiving the requested content from the remote server and buffer a portion of the received content. The portion of the content may be, for example, the first several bytes of a multi-megabyte data transmission. In another example, the portion of the content may be based on a maximum transmission unit or a smallest bufferable data unit. The server may then transmit the portion of the content to the requesting user device, in advance of completely receiving and storing the requested content from the remote server.

In some embodiments, the server may receive data from, and transmit data to, one or more intermediate devices. For example, the server may receive a content request from a modem coupled to or embedded within the client device. In another example, the server may transmit a content request to a service router, which may appropriately route communications to and from the remote server.

In some embodiments, the server may identify the remote server based on a server selection technique, a path selection technique, or both. For example, the server may search a cache server index to identify a remote server that possesses the requested content. The search may be based on address information extracted from a content request, such as a uniform resource identifier (URI) or URI prefix for the requested content.

In some embodiments, the server may identify a communications path for communications with the remote server. For example, the server may perform path selection based on a longest match lookup routine, where the remote server that possesses the longest match of the address information for the requested content is selected.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
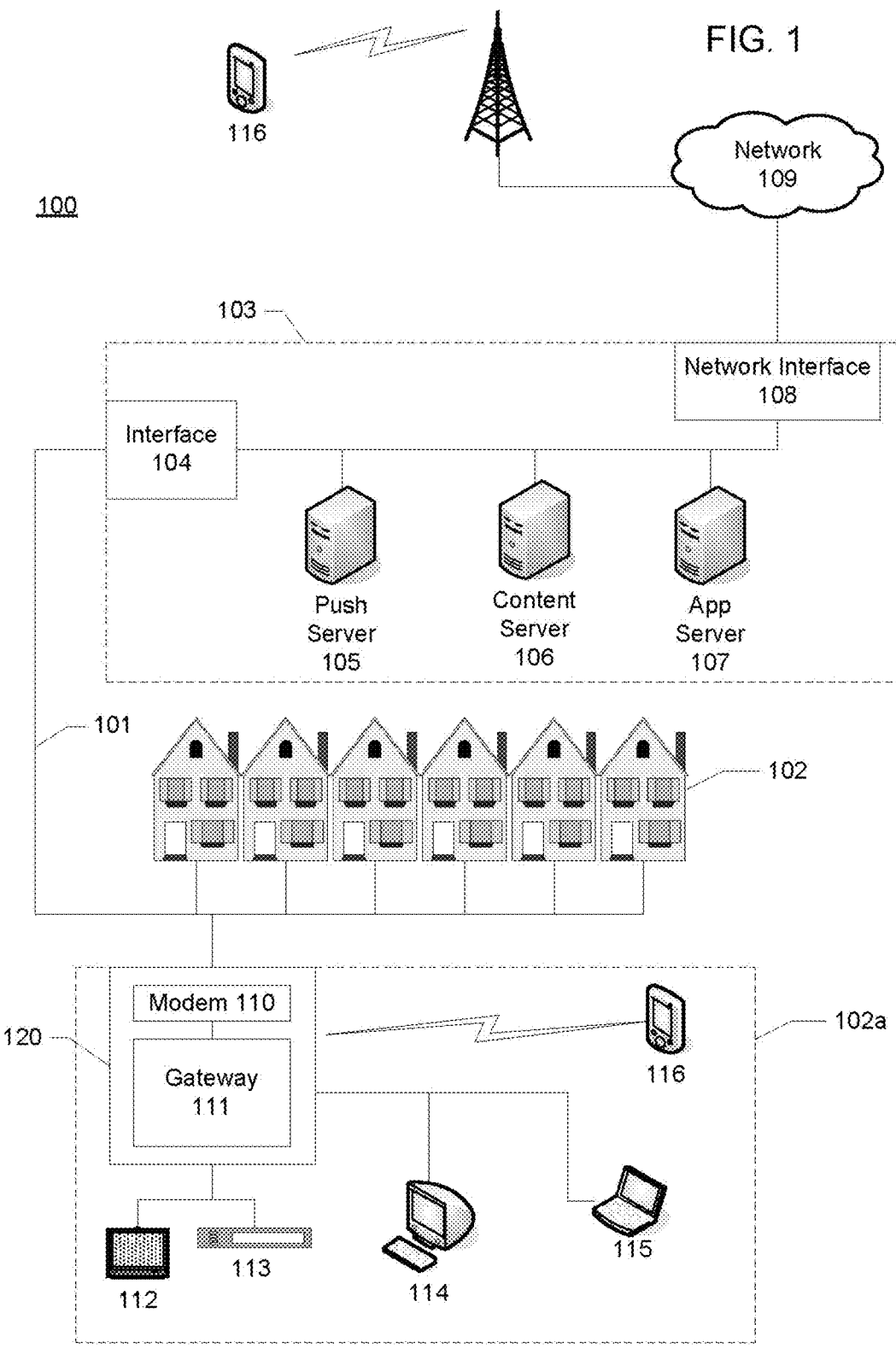
FIG. 1 illustrates an example network.

FIG. 1 illustrates an example information distribution network 100 on which many of the various features described herein may be implemented. Network 100 may be any type of information distribution network, such as satellite, telephone, cellular, wireless, etc. One example may be a wireless network, an optical fiber network, a coaxial cable network or a hybrid fiber/coax (HFC) distribution network. Such networks 100 use a series of interconnected communication links 101 (e.g., coaxial cables, optical fibers, wireless links, etc.) to connect multiple homes 102 or other user locations to a local office or headend 103. The local office 103 may transmit downstream information signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include interface 104, such as a cable modem termination system (CMTS), which may be a computing device configured to manage communications between devices on the network of links 101 and backend devices such as servers 105-107 (to be discussed further below). The CMTS may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The CMTS may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet Protocol devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones, or other network devices. For example, the network 109 may communicate with one or more content sources, such as multicast or unicast video sources, which can supply video streams for ultimate consumption by the various client devices in the homes 102.

As noted above, the local office 103 may include a variety of servers 105-107 that may be configured to perform various functions. For example, the local office 103 may include a push notification server 105 that can generate push notifications to deliver data and/or commands to the various homes 102 in the network (or more specifically, to the devices in the homes 102 that are configured to detect such notifications). The local office 103 may also include a content server 106 configured to provide content to users in the homes. This content may be, for example, video on demand movies, television programs, songs, text listings, etc. The content server may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be used to implement a cache server for the content found on the content server 106. Other example application servers may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for receiving user remote control commands, and processing them to provide an intelligent remote control experience.

An example home 102a may include an interface 120. The interface 120 may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired device having similar functionality. The device 110 may be connected to, or be a part of, a gateway interface device 111. The gateway interface device 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include local network interfaces (not shown) to provide communication signals to devices in the home, such as televisions 112, additional STBs 113, personal computers 114, laptop computers 115, wireless devices 116 (wireless laptops and netbooks, tablet computers, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others. Any of the devices in the home, such as the gateway 111, STB 113, computer 114, etc., can include an application software client that can make use of the video images captured by the image capture servers.

Figure 2:
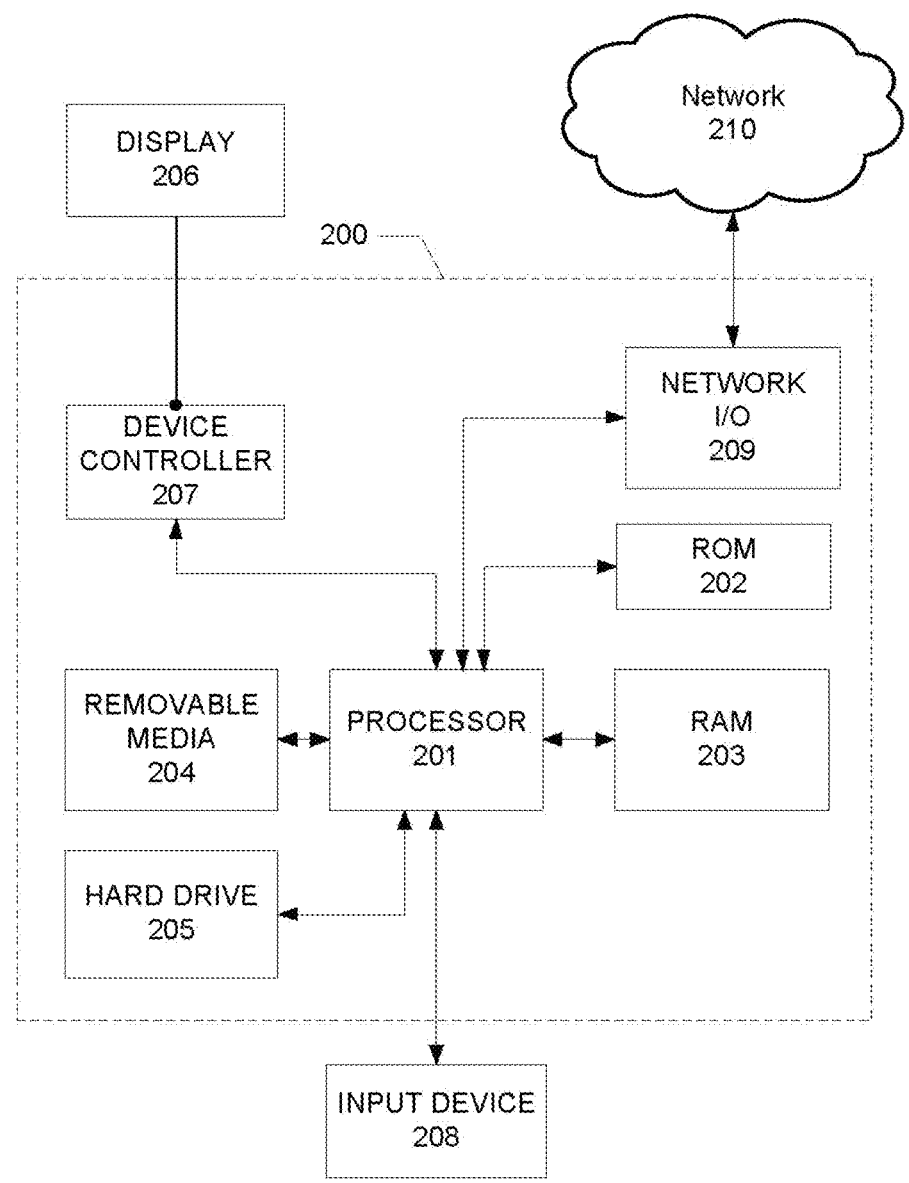
FIG. 2 illustrates an example software and hardware platform on which various elements described herein can be implemented.

FIG. 2 illustrates general hardware elements, software elements, or both that can be used to implement any of the various computing devices and/or software discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in an attached (or internal) hard drive 205. The computing device 200 may include one or more output devices, such as a display 206, such as an external monitor or television, and may include one or more output device controllers 207, such as a video processor. There may also be one or more user input devices 208, such as a remote control, keyboard, mouse, touch screen, microphone, etc. The computing device 200 may also include one or more network interfaces, such as input/output (I/O) interface 209 (e.g., a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Various features described herein offer improved remote control functionality to users accessing content from the local office 103 or another content storage facility or location. For example, one such user may be a viewer who is watching a television program being transmitted from the local office 103. In some embodiments, the user may be able to control his/her viewing experience (e.g., changing channels, adjusting volume, viewing a program guide, etc.) using any networked device, such as a cellular telephone, personal computer, personal data assistant (PDA), netbook computer, etc., aside from (or in addition to) the traditional infrared remote control that may have been supplied together with a television or STB.

Figure 3A:
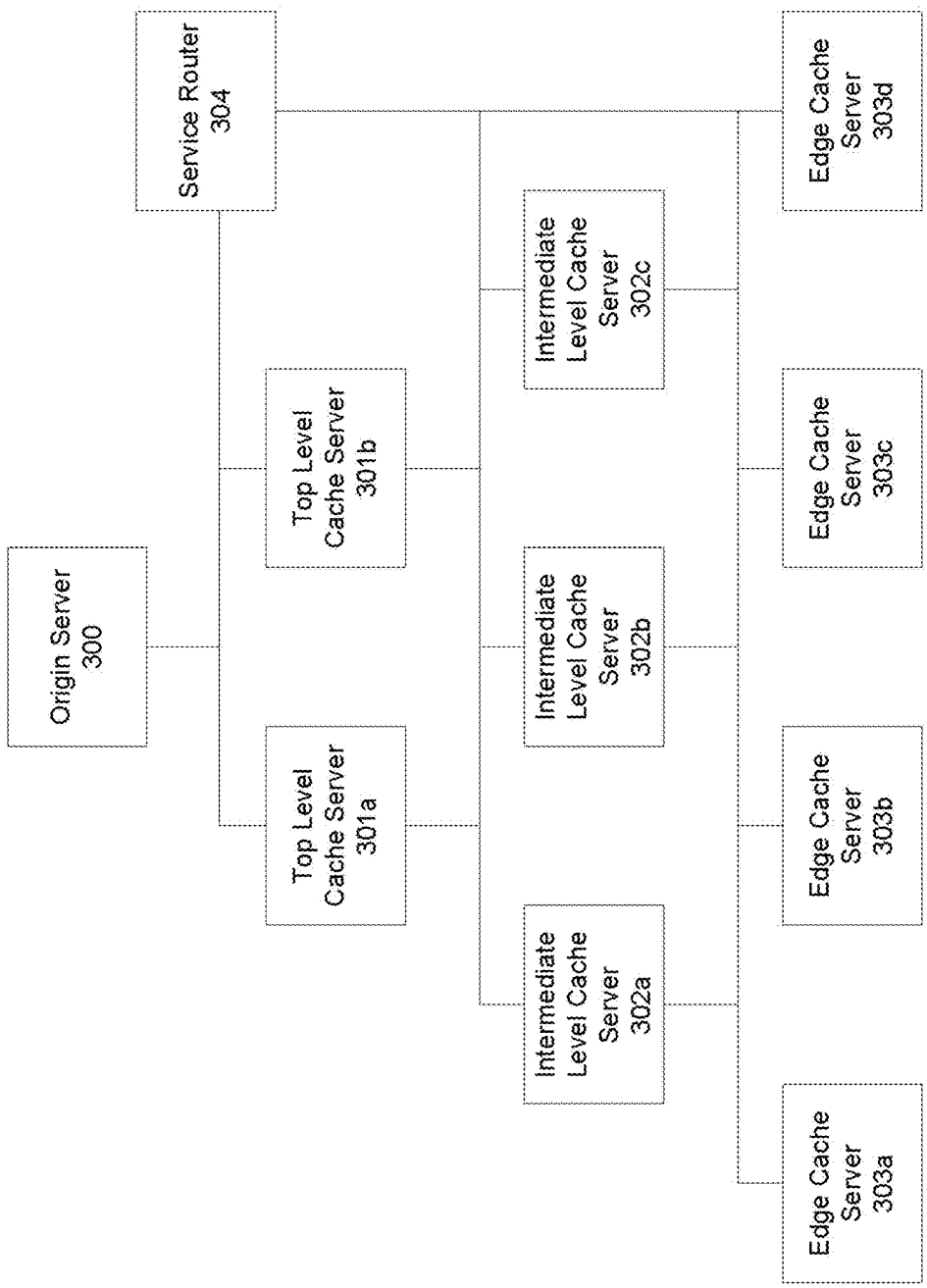
FIG. 3a illustrates an example logical hierarchy for a content delivery network.

FIG. 3*a* illustrates an example distribution hierarchy of computing devices, such as caching servers for an example content delivery network (CDN). The hierarchy of caching servers may be used to help with the distribution of content (e.g., online content) by servicing requests for that content on behalf of the content's source. At the top of the hierarchy is origin server 300. The origin server 300 may be a server that provides one or more pieces of content of a content provider. For example, origin server 300 may be implemented using content server 206 of FIG. 2, and can supply a variety of content to requesting users and devices. The content may be, for example, movies or other data available for on demand access by clients (not shown), and the origin server 300 for a movie may be a server that has access to a copy of the movie or initially makes the movie available. Although FIG. 3*a* illustrates a single origin server 300 for a given distribution hierarchy, multiple origin servers may be used for the given distribution hierarchy.

The origin server 300 may also establish the caching hierarchy that will be used to distribute content. For example, the server 300 may transmit messages to one or more cache servers, requesting that the cache servers assist in caching the origin server's content, and instructing the cache server as to where that cache server should be in the hierarchy for the origin's content domain(s), what domain(s) of content it should (or should not) cache, access restrictions, authentication requirements for granting access, etc.

To facilitate distribution of the content, one or more top level cache servers 301*a-b* can be communicatively coupled to the origin server 300, and each can store a copy of the file(s) containing the content of the origin server 300 (e.g., a copy of the movie files for an on-demand movie). These top level servers can be co-located at the same premises as the origin server 300 and implemented as application servers 107, or they can be located at locations remote from the origin server 300, such as at a different local office connected to the network 109. The top level cache servers 301*a-b* may also receive and respond to client requests for the content. Further down in the hierarchy may be one or more intermediate level cache servers 302*a-c* and edge cache servers 303*a-d*, and these may be implemented using the same hardware as the cache servers 301*a-b*, and can be configured to also receive and respond to client requests for content. Additional layers of caches in the hierarchy may also be used as desired, and the hierarchical arrangement allows for the orderly distribution of the content, updates to the content, and access authorizations. For example, lower level servers may rely on higher lever servers to supply source files for the content and to establish access authorization parameters for the content. In some embodiments, the top and intermediate level servers may refrain from interaction with clients, and may instead limit their content delivery communications to communicating with other servers in the distribution network. Limiting client access to just the lowest level, or edge, servers can help to maintain security and assist with scaling.

The CDN may also include one or more service routers 304, which may be communicatively coupled to all of the cache servers, but which need not be a part of the caching hierarchy. The service router 304 may facilitate communications between the members of the hierarchy, allowing them to coordinate. For example, the servers in the hierarchy may periodically transmit announcement messages to other cache servers, announcing their respective availabilities (e.g., announcing the content that they are able to provide, or the address domains or routes that they support). In some embodiments, the caches may simply transmit a single announcement to a service router 304, and the service router 304 may handle the further distribution of the announcement messages to other servers in the hierarchy. In this manner, the service router 304 may act as a route reflector in a border gateway protocol, reducing the amount of traffic passing directly between the caches.

FIG. 3*a* illustrates a logical hierarchy for a given content delivery network, from its origin 300 (e.g., a server storing the original copy of a particular video asset) down through layers of caches. Each individual piece of content can have its own hierarchy, however, and a single server (e.g., a computing device) can play different roles in the hierarchies for different pieces of content. So, for example, while a first computing device can act as the origin 300 for a first piece of content (e.g., videos from "ESPN.COM"), that same device can act as an intermediate-level cache 302*b* for a different piece of content (e.g., videos from "NBC.COM").

Figure 3B:
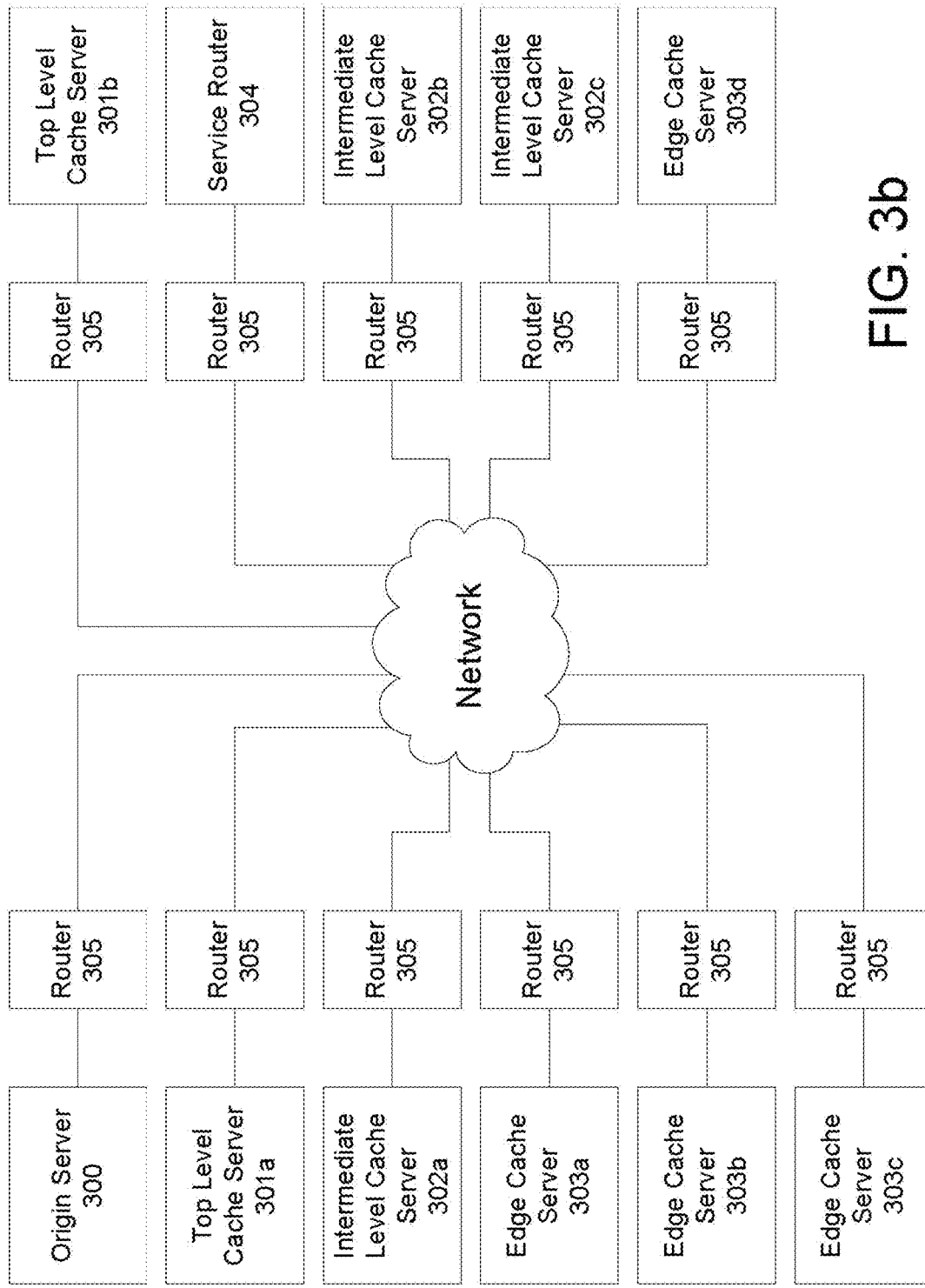
FIG. 3b illustrates an example physical arrangement for the hierarchy.

For some aspects of the disclosure, the physical arrangement of the servers need not resemble FIG. 3*a* at all. As illustrated in FIG. 3*b*, each of the cache servers may be coupled through its own corresponding router 305 to one or more communication network(s). The routers 305 may contain the necessary routing tables and address information to transmit messages to other devices on the network, such as the other caches, client devices, etc.

Figure 4:
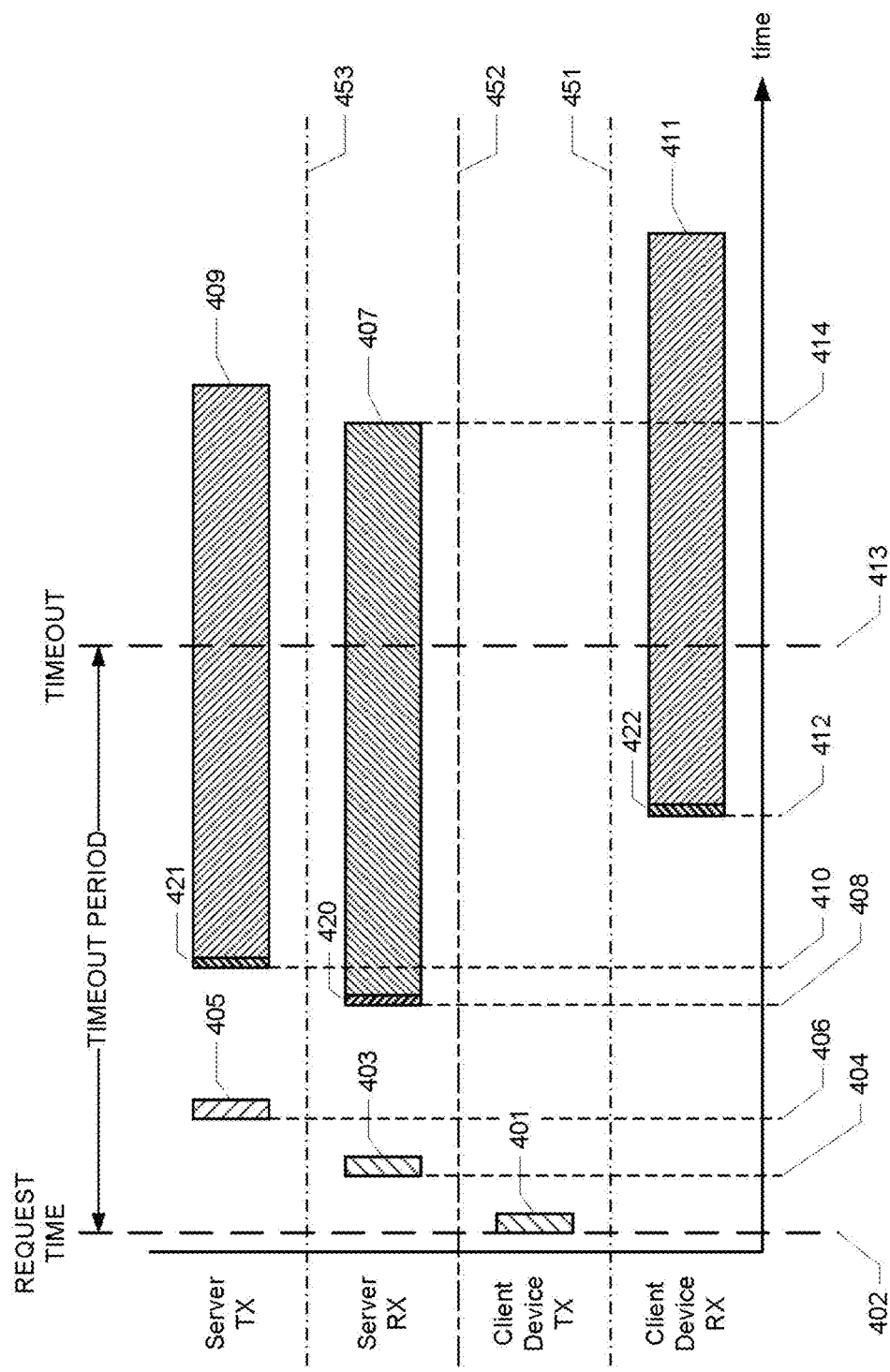
FIG. 4 illustrates an example timeline for a streamlined content delivery technique.

FIG. 4 illustrates an example timeline for a streamlined content delivery technique (e.g., a streamlined HTTP enhancement proxy content delivery technique), in which content is requested and delivered between a client device (e.g., device 200 shown in FIG. 2, gateway device 111 shown in FIG. 1), a server (e.g., device 200 shown in FIG. 2, edge cache server 303 shown in FIG. 3), and a remote server (e.g., device 200 shown in FIG. 2, intermediate level cache server 302 shown in FIG. 3). While a client device and a server are shown in the example streamlined HTTP enhancement proxy content delivery timeline of FIG. 4, the technique may also be used for content delivery among servers, such as server 303 and server 302 shown in FIG. 3, which may or may not be part of the same content delivery network.

As illustrated in FIG. 4, data transmissions as a function of time are shown for the client device and the remote server. Data received by the client device (e.g., "Client Device RX") is illustrated as the portion of FIG. 4 below line 451. Data transmission by the client device (e.g., "Client Device TX") is illustrated as the portion of FIG. 4 above line 451 and below line 452. Data received by the server (e.g., "Server RX") is illustrated as the portion of FIG. 4 above line 452 and below line 453. Data transmission by the server (e.g., "Server TX") is illustrated as the portion of FIG. 4 above line 453. Data receipt and transmission by additional servers, such as remote cache or origin servers, are not shown for the sake of brevity.

The client device may transmit content request 401 at time 402 to a server, for example, in response to a user requesting content using an input device (e.g., input device 200 shown in FIG. 2). Content request 401 may be, for example, an HTTP GET request for a video asset (e.g., a particular movie or program from a website) or a fragment of the video asset. The content fragment may be, for example, any time-based data unit of arbitrary size, such as a two-second video fragment of the user-requested movie or program. In some embodiments, content request 401 may be an HTTP request for a data unit. The data unit may be, for example, a defined unit of content, such as a high definition video asset, a three-dimensional video asset, a two-second video fragment, or any other suitable content or content fragment provided using an HTTP protocol.

Content request 401 may be transmitted by the client device using any suitable transmission device or network, such as network I/O interface 209 shown in FIG. 2, over any suitable communications path or network, such as network 210 shown in FIG. 2, using any suitable communications or network protocol. For example, the client device may open a network protocol session, such as a transmission control protocol (TCP) session or a user datagram protocol (UDP) session, with the server. In another example, content request 401 may be transmitted by the client device to an intermediate device (e.g., modem 110 shown in FIG. 1, interface 104 shown in FIG. 1, network I/O 209 interface shown in FIG. 2, service router 304 shown in FIG. 3, etc.) communicatively coupled between the client device and the server.

In some embodiments, content request 401 may include an address identifier of the client device making the request. The address identifier may contain routing information to indicate how the client device can be contacted. For example, the address identifier may be a dotted-decimal internet protocol (IP) address for the client device or an intermediate device that handles the client device's communications.

In some embodiments, content request 401 may include a uniform resource identifier (URI). For example, content request 401 may include the URI:

"http://www.videocontent.com/tv/NCIS/11915/ 12128607/Restless/videos"

corresponding to user request for an episode of the television program NCIS. In another example, content request 401 may include the URI:

"http://videocontent.net/movies/Avatar/140880/full-movie"

corresponding to a user request for the motion picture Avatar.

In some embodiments, content request 401 may include a URI prefix, such as "videocontent/tv/NCIS/videos" or "videocontent/movies/Avatar/full-movie", to identify a domain or subdomains of the requested content. Although the example URI prefixes use text and the forward slash "/" to indicate sub-domain relationships, other forms of notation may be used. For example, the domain name can be represented in an order that increases in specificity from left to right, such as "net. videocontent.tv.ncis" or "net. videocontent.movies.avatar," or vice versa. In some embodiments, a fully qualified domain name (FQDN) can be used as a URI prefix. For example, the URI prefix may be the FQDN "videocontent.net." or any other suitable FQDN or domain name associated with content request 401.

In some embodiments, the URI prefix can be provided in a shortened form to reduce code bloat. For example, a URI prefix for the movie Avatar could simply be "videocontentavatar."

In some embodiments, content request 401 may include a time duration, a data range, or both corresponding to a fragment of the requested content (e.g., a two-second fragment of requested video content). For example, content request 401 may include a URI appended with the time duration "#t=2,4" corresponding to a two-second video fragment for seconds 2-4 of the requested content. In another example, content request 401 may include the data range "bytes=6000001-12000000" corresponding to the two-second video fragment for seconds 2-4 of a video with an associated data rate of approximately 3 MB/s.

In some embodiments, content request 401 may include or be associated with a timeout, such as timeout 413. Timeout 413 may correspond to a time duration after which the requesting client will respond as if an error has occurred with the original request, and may occur at a specified time after request 401 has been transmitted by the client device. In certain embodiments, a timeout period may correspond to the amount of time between request time 402 and timeout 413. For example, timeout 413 may occur two seconds after request time 402 in association with a two-second timeout period. If the requested content is not received by the client device before the timeout period ends, content request 401 may timeout and transmission of an additional request may begin (e.g., possibly for the requested content at a lower quality or bit rate). If the additional request also times out, the client device's request for content may become abandoned.

The server may receive content request 403 at time 404 from the client device using any suitable receiver device, such as network I/O interface 209 shown in FIG. 2. Content request 403 may be substantially the same as, or a modified version of, content request 401 transmitted by the client device. For example, content request 403 may contain transmission errors (e.g., noise, jitter, etc.) resulting from, for example, the electromagnetic interference in the transmission medium between the client device and the server. In another example, content request 403 may be received from an intermediate device communicatively coupled between the client device and the server. In some embodiments, content request 403 may be received from another server. For example, content request 403 may be received at a higher-level (parent) cache server or origin server from a lower-level (child) cache server.

In some embodiments, the server may check to determine whether it possesses or stores the requested content in its cache memory (e.g., ROM 202, RAM 203, removable media 204, or hard drive 205 shown in FIG. 2), using any suitable technique or circuitry (e.g., processor 201 shown in FIG. 2).

For example, the server may decode request 403 to identify the address information (e.g., URI, URI prefix) of the requested content and perform a search of its memory based on the identified address information. If the requested content is stored in its memory, the server can begin transmitting the requested content to the requesting client (or server), which is not shown for the sake of brevity. If it is not, the server can transmit content request 405 to another server, such as a parent cache server or origin server.

The server may transmit content request 405 at time 406 to a remote server, such as a higher-level cache server or origin server, in response determining that the requested content is not stored in its memory. For example, content request 405 may be an HTTP GET request for the requested video asset or a fragment of the video asset. Content request 405 may be transmitted by the server using any suitable transmission device, such as network I/O interface 209 shown in FIG. 2, over any suitable communications path or network, such as network 210 shown in FIG. 2. For example, the server may open a network protocol session with the remote server. In some embodiments, request 405 may be sent to a router (e.g., service router 304 shown in FIG. 3) for redistribution to other servers in the CDN hierarchy.

In some embodiments, request 405 may include an address identifier of the server making the request. This identifier can contain routing information to indicate how the server can be contacted. This address can be, for example, a dotted-decimal internet protocol (IP) address for the server, or for a router, modem, or network interface that handles the server's communications.

In some embodiments, the server may identify the remote server to which content request 405 will be transmitted using any suitable server selection technique, path selection technique, or both. For example, the server may consult an index of cache servers (e.g., an index or database maintained by service router 304 shown in FIG. 3) to determine what next higher level cache server should service the request. The cache server index may identify, for example, cache destinations for each listed domain as indicated by its URI or URI prefix. The cache server index may also provide path information for obtaining the domain's content when servicing a client request for the content.

In some embodiments, various other factors may be used in the identification and selection of the remote server to which request 405 is to be directed. One factor may be the processing capability of the remote server. For example, a remote server with a faster processing capability may be preferred over a remote server with a slower processing capability. Another factor may be the length of a physical connection between the server and the remote server. The length may include the number of intermediate routers and network legs, and the path selection process may prefer a shorter path. For example, a remote server located in the same domain or CDN may be preferred over a remote server located in a different domain or CDN. Another factor may be the cost (e.g., financial cost, computing cost, time cost) associated with accessing the respective caches. For example, the path selection process conducted by the cache server on the index may select the least costly route. In some embodiments, other business rules, processes, or techniques may be used for sever selection, path selection, or both.

The server may receive content 407 at time 408 from the remote server or from an intermediate device using any suitable receiver device. In some embodiments, the server may initially receive portion 420 of content 407. Portion 420 may be, for example, a portion of the data unit requested by the client device. Portion 420 may be of an arbitrarily small size. For example, portion 420 may be the first 64 bits of a 6 MB video fragment. In some embodiments, the server may store or buffer portion 420 in a temporary storage device (e.g., RAM 204 shown in FIG. 2). In some embodiments, the server may store portion 420, the entire amount of content 407, or both in its cache memory.

In some embodiments, the server may identify the portion or portions of the data unit that it has received. For example, the server may store information identifying the portions of the data unit that have been received. In certain implementations, the server may associate a flag with an index of the data unit. The server may analyze the flag data to determine whether one or more of the portions of the data unit have been received. The server may also, for example, use the flag data to determine whether any portions of a requested data unit are stored in the server's memory. If the server determines that one or more of the portions are stored locally, it may transmit the locally-stored portions to the requesting client device and request additional portions of the data unit from any suitable remote server or content delivery network.

The server may begin transmitting portion 421 of content 409 at time 410 to the requesting client device (e.g., by opening a network protocol session with the client device) upon receiving and buffering portion 420 of content 407. For example, the difference between time 408 and time 410 may be arbitrarily small and limited only by system capabilities. Portion 421 may be substantially the same as, or a modified version of, portion 420. In some embodiments, portion 421 may correspond to data read from a buffered version of portion 420 stored in the server's memory. For example, the size of portion 421 may correspond to the smallest bufferable data unit. In another example, the size of portion 421 may correspond to a maximum transmission unit (MTU).

In some embodiments, the transmission of portion 421 begins in advance of completely receiving content 407 because waiting to completely receive content 407 at time 414 may result in transmission of content 407 beginning after timeout 413 has occurred. In some embodiments, the server may begin a looping process to receive, buffer, and transmit subsequent portions of content 407 until all portions of content 407 have been received. For example, the looping process may proceed until an end of transmission character (EOT) in content 407 has been received and decoded (if needed) by the server.

The client device may receive portion 422 of content 411 at time 412 from the server using any suitable receiver device, such as network I/O interface 209 shown in FIG. 2. Portion 422 may be substantially the same as, or a modified version of, content 421 transmitted by the server. As illustrated in the example streamlined HTTP enhancement proxy content delivery timeline of FIG. 4, the client device receives portion 422 before timeout 413 and timeout 413 may be avoided.

In some embodiments, the client device may present the received content for display on a display device (e.g., television 112, personal computer 114, laptop computer 115, wireless device 116 shown in FIG. 1, display 206 shown in FIG. 2) once it has received all of content 411. If content 411 is a content fragment, the client device may begin a looping process to request the next content fragment of the user requested content. For example, the client device may begin a looping process after decoding an EOT in content 411 to request the next two-second video fragment of the movie or high-definition television program requested by the user. The looping process may proceed by requesting subsequent content fragments until all content fragments of the user requested content have been received.

Figure 5:
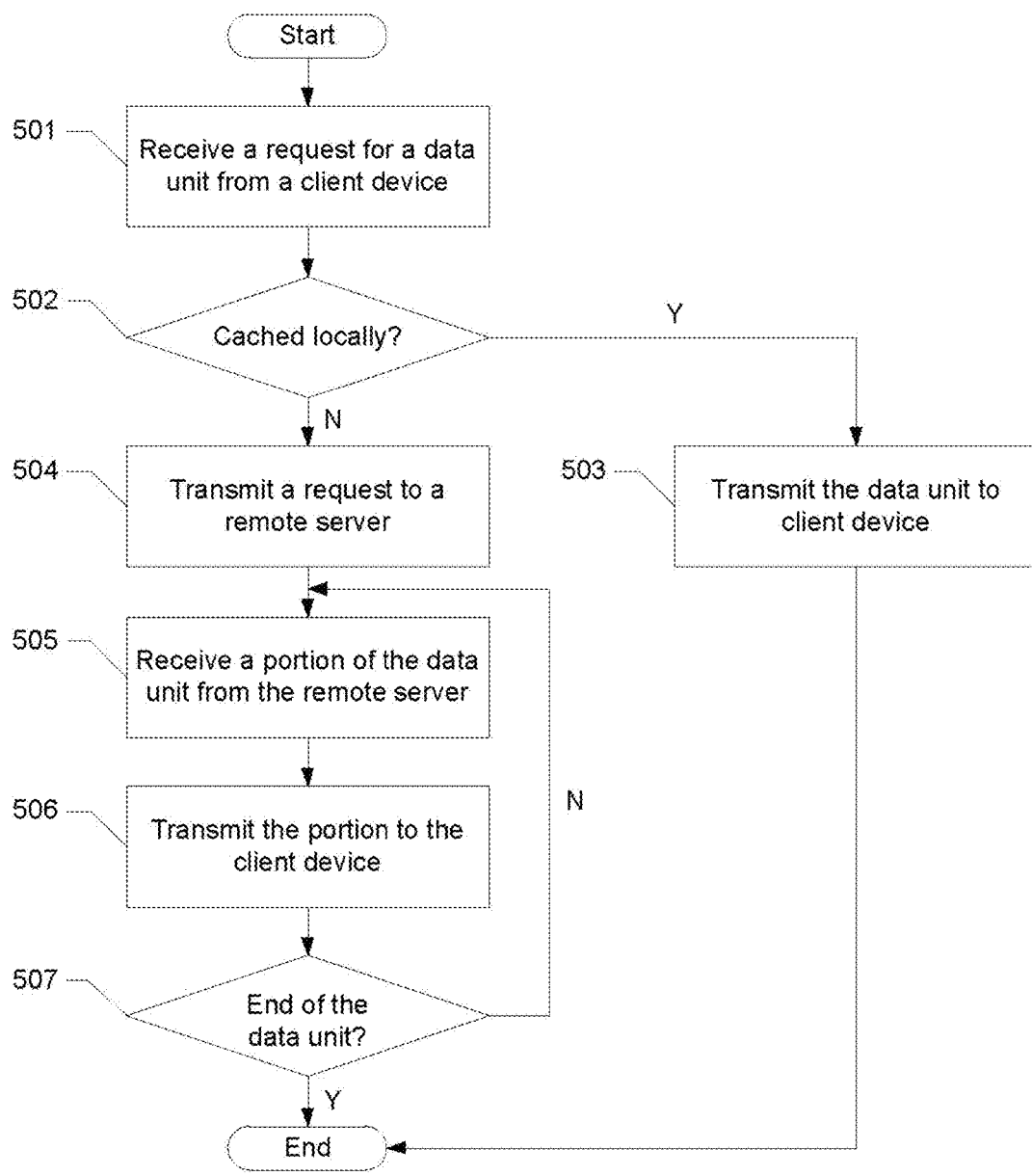
FIG. 5 illustrates an example process flow for providing content using a streamlined content delivery technique.

FIG. 5 illustrates an example process flow for providing content using a streamlined HTTP enhancement proxy content delivery technique.

In step 501, the server receives an HTTP request for a data unit from a client device, such as content request 401 shown in FIG. 4. The data unit may be, for example, a user-requested video asset or a fragment of the user-requested video asset. The request may include address information (e.g., URI, URI prefix) to identify the requested data unit. In some embodiments, the request may be received from an intermediate device or from another cache server.

In step 502, the server determines whether its memory contains a copy of the requested data unit based on address information or other identifying information extracted from the received request. If the server determines that its memory includes a copy of the requested data unit, the process proceeds to step 503. If the server determines that its memory does not include a copy of the requested data unit, the process proceeds to step 504.

In step 503, the server returns a copy of the requested data unit to the requesting client device in response to determining that the data unit was found in the server's memory. For example, the server may return the entire data unit requested by the client device.

In step 504, the server transmits a request for the data unit to a remote server, such as request 403 shown in FIG. 4. In some embodiments, the server may transmit the request an origin or cache server identified using any suitable server selection technique, path selection technique, or both. For example, the server may search a cache server index using a longest match lookup routine to identify the best matching remote server that supports the data unit. If a match is found, then the longest match can be used to generate the request (e.g., request 405 shown in FIG. 4) to the identified remote server.

In step 505, the server begins to receive a portion of the data unit from the remote server, such as portion 420 of content 407 shown in FIG. 4. During receipt of the requested data unit, the server may proceed to step 506 and transmit a portion of the data unit (e.g., portion 421 of content 409) to the client device even though the entire data unit has not been fully received. For example, the server may transmit a fraction of a requested two-second video fragment to the client device as soon as it is received, limited only by the server's performance capabilities. The transmission size may be arbitrarily small, or may be based on an MTU, smallest bufferable data unit, or other suitable parameter. In certain implementations, the transmission may begin as soon as the server receives the portion of the data unit. In certain implementations, if the MTU buffer is filled before the server receives the entire portion of the data unit, the transmission may begin as soon as the MTU buffer is filled.

In step 507, the server determines whether it has received the entire data unit (e.g., by decoding an EOT in content 407 shown in FIG. 4). If the cache server determines that it has not received the end of the data unit, the process returns to step 505. If the cache server determines that it has received the end of the data unit, the process ends.

With the features described above, various advantages may be achieved. An advantage of the present technique is that timeout of the request is avoided in some instances as a result of transmission by the server of an initial portion of the content beginning before the entire requested content has been received at the server (e.g., before timeout has occurred). As a result, a user can request and receive high quality (e.g., high bit rate) videos using an HTTP protocol without, in some instances, the user's client device experiencing timeout. Another advantage of the present technique is that delay in the delivery of content in a CDN is reduced because data is transmitted to the next layer in the CDN hierarchy as soon as or shortly after it is received. Accordingly, the network is not overloaded with redundant content requests and the user's viewing experience is enhanced.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method comprising:
receiving, by a computing device and from a user device, a first request for a content fragment;
based on a determination that a first portion of the content fragment is stored locally in the computing device, transmitting, by the computing device and to the user device, the first portion of the content fragment;
transmitting, by the computing device and to a server device, a second request for a second portion of the content fragment, wherein the first portion of the content fragment and the second portion of the content fragment are different portions of the content fragment;
determining, prior to receiving an entirety of the second portion of the content fragment from the server device, that a buffer, of the computing device, is filled;
transmitting, by the computing device and to the user device, and based on the determining that the buffer is filled, an initial received portion of the second portion of the content fragment, from the filled buffer; and
transmitting, by the computing device and to the user device, and after transmitting the initial received portion, an additional received portion of the second portion of the content fragment, wherein the initial received portion and the additional received portion are different portions of the second portion of the content fragment.

2. The method of claim 1, wherein the content fragment corresponds to a fragment of video content.

3. The method of claim 1, wherein the first request for the content fragment comprises a hypertext transfer protocol (HTTP) request for the content fragment,
wherein the HTTP request comprises a timeout value indicating a time period after transmission of the request at which a timeout may occur, and
wherein the transmitting the additional received portion of the content fragment comprises transmitting the additional received portion of the content fragment in advance of the timeout.

4. The method of claim 1, wherein the transmitting the second request comprises transmitting the second request via a service router.

5. The method of claim 1, further comprising determining the server device based on a search of a cache server device index.

6. The method of claim 5, wherein the determining the server device comprises determining the server device based on a uniform resource identifier extracted from the first request.

7. The method of claim 5, wherein the determining the server device comprises determining the server device based on a uniform resource identifier prefix extracted from the first request.

8. The method of claim 1, wherein the transmitting, by the computing device and to the user device, the first portion of the content fragment comprises opening a network protocol session with the user device.

9. The method of claim 1, wherein:
the transmitting the additional received portion comprises transmitting the additional received portion based on non-receipt of an end of transmission indicator of the second portion.

10. The method of claim 1, further comprising:
selecting, from a plurality of servers and based on a factor, the server device to which the second request is transmitted,
wherein the factor comprises processing capability of the server device, or a length of a physical connection between the server device and the computing device.

11. The method of claim 1, wherein the first request comprises address information identifying the content fragment, and
the method further comprising:
selecting, from a plurality of servers, the server device to which the second request is transmitted, wherein the server device possesses a longest match of the address information.

12. The method of claim 1, wherein the transmitting the additional received portion of the second portion of the content fragment comprises:
determining, by the computing device and based on flag data associated with an index of the additional received portion of the second portion of the content fragment, whether part of the additional received portion of the second portion of the content fragment has been received by the computing device.

13. An apparatus comprising:
a buffer configured to store data;
one or more processors; and
memory storing instructions that, when executed by the one or more processors, cause the apparatus to:
receive, from a user device, a first request for a content fragment;
determine that a first portion of the content fragment is stored locally in the apparatus;
transmit, to the user device, the first portion of the content fragment;
receive, from a server device, a second portion of the content fragment, wherein the first portion of the content fragment and the second portion of the content fragment are different portions of the content fragment;
store a portion of the second portion of the content fragment in the buffer;
prior to the apparatus receiving an entirety of the second portion of the content fragment from the server device and based on determining that the buffer is full, transmit, to the user device and from the full buffer, the portion of the second portion of the content fragment;
determine whether an end of transmission indicator, of the second portion of the content fragment, has been received; and
based on determining that the end of transmission indicator has not been received, transmit, to the user device, at least one additional portion of the second portion of the content fragment.

14. The apparatus of claim 13, wherein the first request comprises a timeout, and wherein the instructions, when executed by the one or more processors, cause the apparatus to transmit the portion of the second portion of the content fragment in advance of the timeout.

15. The apparatus of claim 13, wherein the instructions, when executed by the one or more processors, cause the apparatus to:
determine whether the second portion of the content fragment is stored in the apparatus, and
based on determining that the second portion of the content fragment is not stored in the apparatus, transmit, to the server device, a second request for the second portion of the content fragment.

16. The apparatus of claim 13, wherein the instructions, when executed by the one or more processors, cause the apparatus to determine the server device based on a search of a cache server device index.

17. The apparatus of claim 16, wherein the instructions, when executed by the one or more processors, cause the apparatus to determine the server device based on a uniform resource identifier extracted from the first request.

18. The apparatus of claim 16, wherein the instructions, when executed by the one or more processors, cause the apparatus to determine the server device based on a uniform resource identifier prefix extracted from the first request.

19. A system comprising:
a user device; and
a server device, wherein the server device comprises;
a buffer configured to store data;
one or more processors; and
memory storing instructions that, when executed by the one or more processors, cause the server device to:
receive, from the user device, a request for a content fragment;
determine that a first portion of the content fragment is stored locally in the server device;
transmit, to the user device, the first portion of the content fragment;
receive, from a second server device, a second portion of the content fragment, wherein the first portion of the content fragment and the second portion of the content fragment are different portions of the content fragment;
store a portion of the second portion of the content fragment in the buffer;
prior to the server device receiving an entirety of the second portion of the content fragment from the second server device, and based on determining that the buffer is full, transmit, to the user device and from the full buffer, the portion of the second portion of the content fragment;
determine whether an end of transmission indicator, of the second portion of the content fragment, has been received; and
based on determining that the end of transmission indicator has not been received, transmit, to the user device, at least one additional portion of the second portion of the content fragment; and
wherein the user device comprises:
one or more processors; and
memory storing instructions that, when executed by the one or more processors of the user device, cause the user device to:
send the request for the content fragment; and
receive the first portion of the content fragment, the portion of the second portion of the content fragment, and the at least one additional portion of the second portion of the content fragment.

20. The system of claim 19, wherein the memory of the server device stores instructions that, when executed by the one or more processors of the server device, cause the server device to:
    determine that the second portion of the content fragment is not locally stored in the server device; and
    transmit, to the second server device and based on determining that the second portion of the content fragment is not locally stored, a request for the second portion of the content fragment.

21. The system of claim 19, wherein the request for the content fragment comprises a hypertext transfer protocol (HTTP) request for the content fragment,
    wherein the HTTP request comprises a timeout value indicating a time period after transmission of the HTTP request at which a timeout may occur, and
    wherein the instructions stored in the memory of the server device, when executed by the one or more processors of the server device, cause the server device to transmit the portion of the second portion of the content fragment in advance of the timeout.

22. The system of claim 19, wherein the instructions stored in the memory of the server device, when executed by the one or more processors of the server device, cause the server device to determine the second sever device based on a search of a cache server device index.

* * * * *

UNITED STATES PATENT AND TRADEMARK OFFICE
CERTIFICATE OF CORRECTION

| | |
|---|---|
| PATENT NO. | : 10,218,756 B2 |
| APPLICATION NO. | : 13/344674 |
| DATED | : February 26, 2019 |
| INVENTOR(S) | : Joseph Yongxiang Chen |

It is certified that error appears in the above-identified patent and that said Letters Patent is hereby corrected as shown below:

In the Specification

Column 5, Detailed Description, Line 42:
Please delete "206" and insert --106--

Column 7, Detailed Description, Line 22:
Delete "200" and insert --208--

Column 9, Detailed Description, Line 61:
Delete "sever" and insert --server--

Column 10, Detailed Description, Line 4:
Delete "204" and insert --203--

In the Claims

Column 12, Line 33:
In Claim 1, after "portion", insert --,--

Column 15, Line 25:
In Claim 22, delete "sever" and insert --server--

Signed and Sealed this
Ninth Day of July, 2019

Andrei Iancu
*Director of the United States Patent and Trademark Office*